A. W. PATTISON.
VEHICLE SEAT.
APPLICATION FILED OCT. 13, 1913.

1,143,310.

Patented June 15, 1915.

Witnesses:
E. R. Barrett
C. R. Stickney

Inventor
Albert W. Pattison

UNITED STATES PATENT OFFICE.

ALBERT W. PATTISON, OF DETROIT, MICHIGAN, ASSIGNOR TO GRINNELL ELECTRIC CAR CO., OF DETROIT, MICHIGAN, A CORPORATION OF MICHIGAN.

VEHICLE-SEAT.

1,143,310.   Specification of Letters Patent.   Patented June 15, 1915.

Application filed October 13, 1913. Serial No. 794,821.

*To all whom it may concern:*

Be it known that I, ALBERT W. PATTISON, a citizen of the United States of America, residing at Detroit, in the county of Wayne and State of Michigan, have invented certain new and useful Improvements in Vehicle-Seats, of which the following is a specification, reference being had therein to the accompanying drawings.

In the arrangement of seats in inclosed bodies for vehicles it is frequently desirable to be able to shift the forward seat to bring it into position for driving and to do this without the use of tools so that the occupant may make the change readily.

When in the driving position it is especially necessary that the seat be rigid so that the controlling mechanism may be manipulated by the occupant without trouble.

This invention relates to a seat for vehicles and more particularly those of the self-propelled type so arranged that it may be shifted from one position to another and locked securely without any trouble.

The invention consists in the matters hereinafter set forth and more particularly pointed out in the appended claims.

Figure 1:
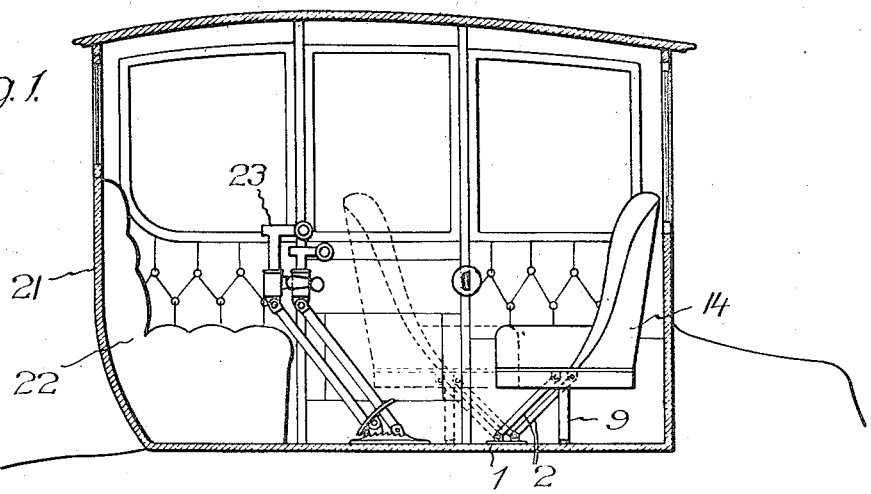
Figure 2:
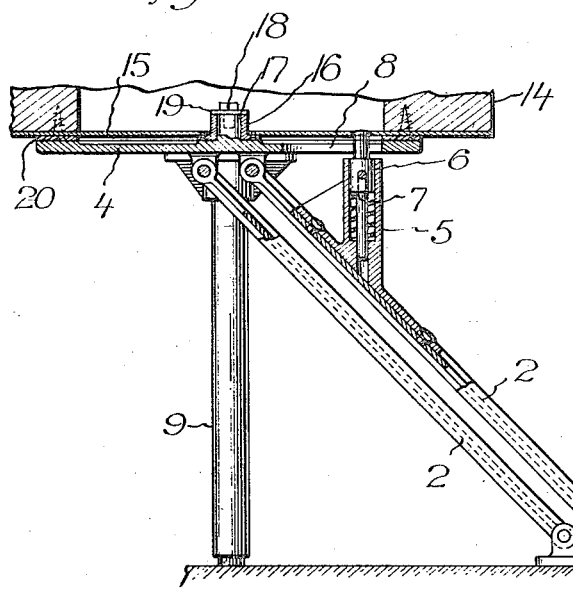
Figure 3:
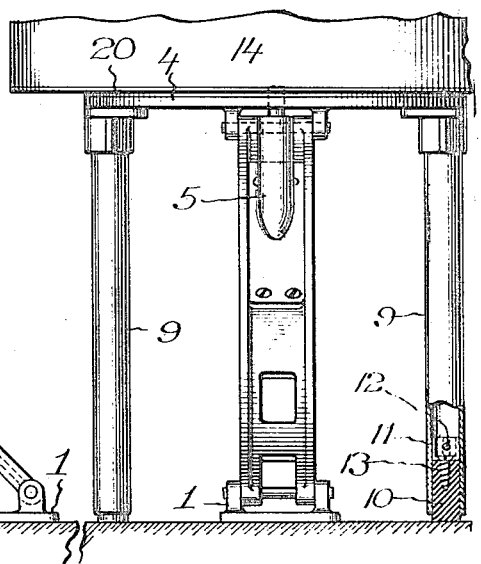
Figure 4:
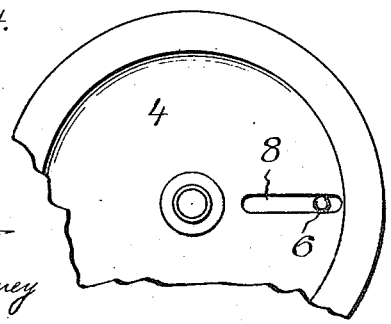

In the drawings, Figure 1 is a view in longitudinal section, largely diagrammatic, of a vehicle body equipped with a seat that embodies features of the invention; Fig. 2 is a view in transverse section through the seat showing the parts when locked; Fig. 3 is a view in detail in rear elevation of the supporting parts, partially broken away and in section; and Fig. 4 is a view in detail of the locking mechanism.

In the drawings, an inclosed vehicle body 21 has the usual back seat 22 and the controlling mechanism indicated at 23 which is adapted to be thrown forward for operation from the forward part of the body or which may be double, one set of the controlling levers being at the front of the vehicle and the other at the rear. Or there may be only one seat at the front of the vehicle.

A base plate 1 is attached to the floor of the vehicle body and is pivoted to a pair of links 2 whose upper ends are secured as by studs to a bottom plate 4 of suitable design or material, the links being arranged to hold the bottom plate in proper relation to the body floor regardless of whether they are tilted forward or back. An upwardly extending boss 5 on one of the links forms a seat for a plunger 6 that is normally projected therefrom by a spring 7 against the base plate 4 and through a slot 8 therein whenever the seat is in retracted position.

A pair of depending posts 9 extend from the plate 4 and are arranged to rest on the vehicle floor when the links 2 are tilted fully forward or fully backward. Slight adjustment and cushioning effect are provided by means of rubber blocks 10 or the like inserted in the posts 9 which are preferably tubular, and secured as desired by bushings 11 that are held each in adjusted position by a clamping screw 12 or the like. A holding screw 13 from the head of the bushing engages the body of the plug or it is cemented or otherwise made fast thereto.

A chair body 14 has a base frame 15 that is centered by means of a suitable sleeve 16 on a pivot stud 17 of the member 4, a cap screw 18 or the like with washer 19 retaining the parts in position.

A ring 20 forms a bearing for the frame on the base 4. When the seat is turned on the base pivot stud into driver's position, that is, facing directly forward in the vehicle with the links tilted backward, the latch plunger 6 is projected by the spring 7 into a holding notch or recess in the seat body so that the latter is locked from turning.

As a result of this construction a seat is obtained that is readily swung forward or back, is freely turnable and is normally locked when in driver's position. It is to be understood that the recess engaged by the locking plunger is so shaped that the operator may by a sufficient pull, turn the chair on its base although the latter is locked normally against any ordinary turning effort.

Obviously, changes in the details of construction may be made without departing from the spirit of my invention and I do not care to limit myself to any particular form or arrangement of parts.

What I claim is:—

1. A vehicle seat comprising a base, holding means swinging on the base, a chair body rotatably mounted on the holding means, and adjustable means depending from the body for supporting it in operative position when at either end of the limit of motion of the holding means.

2. A vehicle seat comprising a base, holding means swinging on the base, a chair body rotatably mounted on the holding means, means depending from the body for supporting the latter in operative position when at either end of the limit of motion of the holding means, and locking means on the holding means for engaging the chair body when the latter is at one end of its limit of motion.

3. A vehicle seat comprising a base, holding means swinging on the base in an upright plane, a chair body rotatably mounted on the holding means, and arranged to maintain an operative position in all positions, supporting means depending from the chair body for carrying the latter when at either end of the limit of motion of the holding means, and means for automatically engaging and locking the chair body from turning when the holding means are at one end of the limit of motion thereof.

4. A vehicle seat comprising a base, a pair of links oscillatable thereon in an upright plane, a base plate carried on the upper ends of the links, a chair seat rotatably mounted on the base plate, and arranged to maintain an operative position, supports depending from the base plate for carrying the latter when the links are at either end of their limit of motion, and locking means on one of the links adapted to yieldingly engage the chair seat when the links are at one end of their limit of motion.

5. The combination in a vehicle body, of a rotatable seat mounted on the floor of the vehicle to swing backward and forward in an upright plane always in operative position and provided with supports bearing on the floor of the vehicle when the seat is at either end of its limit of motion.

6. The combination in a vehicle body, of a rotatable seat mounted on the floor of the vehicle to swing backward and forward in an upright plane and provided with adjustable supports bearing on the floor of the vehicle when the seat is at either end of its limit of motion, the seat maintaining an operative position and means for locking the seat from rotation when at one end of its limit of motion.

7. The combination in an automobile with steering and controlling means, of a rotatable seat supported on the floor of the vehicle to swing in an upright plane in and out of operative relation to the steering and controlling means, and means for locking the seat from rotation when in operative relation to the steering and controlling means.

8. The combination in an automobile having steering and controlling means, of a vehicle body, a rotatable seat secured to the body floor to swing in an upright plane in and out of operative relation to the steering and controlling means and provided with supporting members resting on the floor when the seat is at either end of its limit of motion, the seat always maintaining its operative position, and means for locking the seat from turning when in operative relation to the steering and controlling means.

9. In a motor vehicle, the combination of the body thereof, with a base mounted on the floor of the body, a base plate, a pair of parallel links swinging in an upright plane and articulating the base plate and base maintaining the base plate in substantially horizontal position, a seat frame rotatably secured on the base plate, and longitudinally adjustable supports depending from the plate and resting on the vehicle floor when the seat is at either end of its limit of motion.

10. In a motor vehicle, the combination of the body thereof, with a base mounted on the floor of the body, a base plate, a pair of parallel links swinging in an upright plane and articulating the base plate and base to maintain the base plate in substantially horizontal operative position, a seat frame rotatably secured on the base plate, longitudinally adjustable supports depending from the plate and resting on the vehicle floor when the seat is at either end of its limit of motion, and a locking member mounted on the links and engaging the seat from rotation when the latter is at one end of its limit of motion.

11. In a motor vehicle, a base plate, a base, a pair of links articulating the plate and base, a pair of supporting posts depending from the plate, longitudinally adjustable yielding feet in the posts adapted to rest on the floor of the vehicle body when the links are at either end of their limit of motion, a spring plunger on one of the links that projects through a slot in the plate when the links are tilted rearwardly, and a seat frame rotatably mounted on the plate and engaged and locked by the plunger when the seat is faced forward in the rearward position of the links, the links maintaining the plate in substantially horizontal position.

In testimony whereof I affix my signature in presence of two witnesses.

ALBERT W. PATTISON.

Witnesses:
OTTO F. BARTHEL,
ANNA M. DORR.